US 6,879,316 B2

(12) United States Patent
Kehlstadt et al.

(10) Patent No.: US 6,879,316 B2
(45) Date of Patent: Apr. 12, 2005

(54) POINTING DEVICE WITH PRESSURE SENSITIVE RESISTOR

(75) Inventors: Florian Max Kehlstadt, Aclens (CH); Baptiste Merminod, Vevey (CH); Laurent Plancherel, Lausanne (CH); Emmanuel Dubois, Gex (FR)

(73) Assignee: Logitech Europe, S.A., Romanel-sur-Morges (CH)

( * ) Notice: Subject to any disclaimer, the term of this patent is extended or adjusted under 35 U.S.C. 154(b) by 119 days.

(21) Appl. No.: 10/010,072

(22) Filed: Dec. 11, 2001

(65) Prior Publication Data

US 2003/0107547 A1 Jun. 12, 2003

(51) Int. Cl.$^7$ ............................. G09G 5/08; G09G 5/00
(52) U.S. Cl. ....................... 345/163; 345/164; 345/165; 345/166; 345/156; 345/684; 345/687
(58) Field of Search ................................ 345/156–178, 345/684, 687

(56) References Cited

U.S. PATENT DOCUMENTS

| | | | |
|---|---|---|---|
| 3,806,471 A | | 4/1974 | Mitchell |
| 4,313,113 A | | 1/1982 | Thornburg |
| 4,315,238 A | | 2/1982 | Eventoff |
| 4,489,302 A | | 12/1984 | Eventoff |
| 5,184,120 A | | 2/1993 | Schultz |
| 5,302,936 A | | 4/1994 | Yaniger |
| 5,313,229 A | | 5/1994 | Gilligan et al. |
| 5,530,455 A | | 6/1996 | Gillick et al. |
| 5,555,894 A | | 9/1996 | Doyama et al. |
| 5,657,051 A | | 8/1997 | Liao |
| 5,659,334 A | | 8/1997 | Yaniger et al. |
| 5,691,747 A | * | 11/1997 | Amano ........................ 345/167 |
| 5,748,185 A | | 5/1998 | Stephan et al. |
| 5,771,038 A | | 6/1998 | Wang |
| 5,790,102 A | | 8/1998 | Nassimi |
| 5,805,144 A | | 9/1998 | Scholder et al. |
| 5,828,363 A | | 10/1998 | Yaniger et al. |
| 5,847,639 A | * | 12/1998 | Yaniger ........................ 338/99 |
| 5,854,624 A | | 12/1998 | Grant |
| 5,883,619 A | * | 3/1999 | Ho et al. ..................... 345/163 |
| 5,910,798 A | | 6/1999 | Kim |

(Continued)

FOREIGN PATENT DOCUMENTS

JP        2001222373 A    *   8/2001   ........... G06F/3/033

OTHER PUBLICATIONS

Rubenking, Neil J., "Hear Yourself Type", PC Magazine, Mar. 20, 2001, v20n06, Mouse Events Section.*

(Continued)

Primary Examiner—Henry N. Tran
Assistant Examiner—Peter Prizio, Jr.
(74) Attorney, Agent, or Firm—Townsend and Townsend and Crew LLP

(57) ABSTRACT

An input device with a pressure-sensitive element using a pressure sensing resistor. A solid elastomeric material is mounted over the pressure sensing resistor to transfer a force from the user's finger to the pressure sensitive resistor without visible deformation of the elastomeric material. This provides a comfortable button for a user which does not require the compression of a domed cap to provide pressure-sensing input. In another aspect of the invention, a pressure-sensing input element utilizes both the amount of pressure and the amount of time to determine the type of signal provided to the electronic system. In another aspect of the present invention, an input device contains a first scrolling element (e.g. a wheel) and includes a switch button mounted close to the scrolling element to activate continuous scrolling. In one embodiment of the invention, the pressure sensing resistor used is a folded-over metal-coated plastic film which is responsive to very low activation forces, such as forces less than 50 grams.

1 Claim, 3 Drawing Sheets

U.S. PATENT DOCUMENTS

| | | | |
|---|---|---|---|
| 5,943,044 | A | 8/1999 | Martinelli et al. |
| 5,999,084 | A | 12/1999 | Armstrong |
| 6,198,473 | B1 | 3/2001 | Armstrong |
| 6,239,790 | B1 | 5/2001 | Martinelli et al. |
| 6,271,824 | B1 * | 8/2001 | Chang .................. 345/685 |

OTHER PUBLICATIONS

"Durapoint—The World's toughest Mouse" product advertisement, Interlink Electronics Camarillo, CA (1997).

"Durapoint Specifications" product specifications, Interlink Electronics Camarillo, CA (1997).

"IBM Scrollpoint Mouse—Overview," product specification and photograph, IBM Corporation Armonk, New York (1997, 2004).

"Remotepoint RF User's Guide Version 1.6," Interlink Electronics Camarillo, CA (1999).

"Remotepoint RF," product information, Interlink Electronics Camarillo, CA (1999).

"VersaPoint Pressure Pointing Technology," product information, Interlink Electronics Camarillo, CA (1998).

* cited by examiner

POINTING DEVICE WITH PRESSURE SENSITIVE RESISTOR

CROSS-REFERENCE TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to input devices with analog inputs, and in particular to scrolling elements.

A number of mice designs include a scrolling wheel which can be rotated with a user's finger to scroll a display. An example is U.S. Pat. No. 5,530,455. In addition to providing scrolling corresponding to the turning of the wheel by the user, when a certain momentum threshold is exceeded, continuous scrolling is provided. Thus, a user can give quick spin to the wheel to cause it to enter a continuous scrolling mode, which does not require further movement by the user to maintain it. Clicking any button of the mouse will stop the continuous scrolling.

In addition to scrolling wheels, some mice and other input devices also include force-sensitive inputs. Interlink U.S. Pat. No. 5,659,334 shows a microstick mounted on a Force Sensing Resistor®(a registered trademark of Interlink Electronics). One of the uses of the microstick would be for scrolling.

U.S. Pat. No. 5,805,144 shows a mouse with an integrated touchpad. The touchpad can include an elongated portion which acts as a slide-bar, allowing analog control. The touchpad can also detect varying pressure to provide another input dimension.

U.S. Pat. No. 6,198,473, issued to inventor Brad Armstrong, shows a computer mouse with a pressure-sensitive depressible button. The button can be used to provide scrolling, with the speed of the scrolling varying with the applied pressure. The button is an elastomeric dome-cap button in which the dome-cap collapses to come in contact with a compressible, partially conductive element, which is a carbon in an elastomeric or rubber binder. The more pressure applied to the conductive element, the more electricity it will conduct.

One type of pressure-sensitive input element is a resistor which senses force, such as the Force Sensing Resistor® (FSR®) available from Interlink Electronics. Such a resistor typically includes two conductors mounted on spaced apart substrates, with the substrates being compressed to close the gap and provide contact between the conductors. The signal output varies in accordance with the area of contact. An example is set forth in Interlink U.S. Pat. No. 5,302,936.

BRIEF SUMMARY OF THE INVENTION

The present invention provides an input device with a pressure-sensitive element using a pressure sensing resistor. A solid elastomeric material is mounted over the pressure sensing resistor to transfer a force from the user's finger to the pressure sensitive resistor without visible deformation of the elastomeric material. This provides a comfortable button for a user which does not require the compression of a domed cap to provide a pressure-sensitive input.

In one embodiment, the pressure sensing resistor includes two spaced apart contacts, with the gap being closed by the application of pressure by the user, and the signal output varying with the area of contact. The pressure sensing resistor is used to provide a scrolling input to an electronic system, such as a computer. The speed of the scrolling can be controlled by the amount of force applied.

In another aspect of the invention, a pressure-sensing input element utilizes both the amount of pressure and the amount of time to determine the type of signal provided to the electronic system. For a contact which is less than a predetermined amount of time, a single movement of predetermined amount is provided, such as a single ratchet of a scrolling movement on a screen. This movement is independent of the amount of pressure applied. When contact is provided for more than the predetermined amount of time, continuous movement (e.g. scrolling) is performed at a speed corresponding to the amount of pressure applied. Thus, a user can tap the input element to scroll in small increments, and can provide for continuous scrolling by applying an amount of pressure corresponding to the desired amount of speed.

In another aspect of the present invention, an input device contains a first scrolling element (e.g. a wheel) and includes a switch button mounted close to the scrolling element to activate continuous scrolling. In the embodiment of a scrolling wheel, the user can rotate the scrolling wheel and contact the switch button with the finger at one end of the scrolling wheel to activate continuous or auto-repeat scrolling. In one embodiment, the switch button can be a pressure-sensitive button, with the amount of pressure controlling the speed of the continuous scrolling.

In one embodiment of the invention, the pressure sensing resistor used is a folded-over metal-coated polyester film (alternately, any plastic or thermoplastic film could be used). The spacing between the two folded plys of the film is provided by the spring force at the fold, rather than the use of spacers as in the prior art. This provides a pressure sensitive resistor which is responsive to very low activation forces, such as forces less than 50 grams. This provides for comfortable user input which does not require excessive force to be applied by the users finger.

For further understanding of the nature and advantages of the invention, reference should be made to the following description taken in conjunction with the accompanying drawings.

DETAILED DESCRIPTION OF THE INVENTION

Continous Scrolling Buttons

Figure 1:
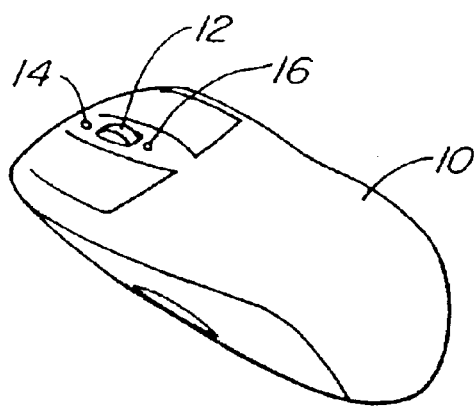
FIG. 1 is a perspective view of a mouse incorporating an embodiment of the present invention, showing a scrolling wheel with adjacent continuous scrolling buttons.

FIG. 1 illustrates a mouse 10 having a scrolling wheel 12. In front of and behind the scrolling wheel are continuous scrolling (auto-repeat) buttons 14, 16.

Figure 5:
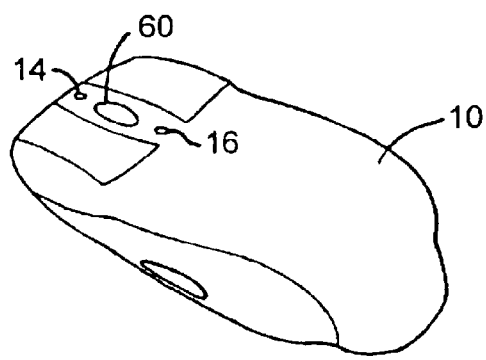
FIG. 5 is a diagram of an embodiment of a mouse with an elongated scrolling strip.

When a user rotates wheel 12, at the end of the rotation forward, the user can easily contact button 14. At the end of a rotation backward, the user can easily contact button 16. Buttons 14, 16 provide an auto-repeat, or continuous scrolling function. These buttons cause scrolling to continue in the direction of the movement of the wheel, without requiring the user to continuously turn the wheel. Alternately, instead of a wheel, a solid state roller or touchpad (such as the elongate strip 60 shown in FIG. 5) could be used for the scrolling function. The continuous scrolling function could be implemented by a region at the end of the solid state roller or touchpad. An example of a solid state roller is set forth in copending application "Pointing Device with Solid State Roller," filed Dec. 22, 2000, Ser. No. 60/258,133, the disclosure of which is incorporated herein by reference.

In one embodiment, buttons 14, 16 normally serve other input functions, and are used for the auto-repeat or continuous scrolling only if contacted within a certain amount of time (time out) after the last rotation of the wheel. In one embodiment, the time-out is 0.5 or 1 second. The other functions of the buttons may be be, in one example, a page up and page down, respectively. Another example function would be back and forward.

In another embodiment, buttons 14, 16 are pressure-sensitive buttons, so that the repetition rate of the auto-scroll can vary in accordance with the amount of pressure applied by the user. Alternately, the auto-repeat speed can be a predefined fixed speed. Alternately, the auto-repeat rate could be the speed at which the wheel was turning before the user contacted the button. In yet another alternate embodiment, the auto-scrolling could be activated by contacting the button before rotating the wheel, with the rotation of the wheel indicating the direction in which to scroll.

The auto-repeat scrolling function can be implemented in hardware within the mouse, or in firmware in the mouse microcontroller (embedded code, hard coded in ROM). Alternately, it could be in software in the mouse driver.

In another alternate embodiment, the repeat scrolling function could be independent of the existing scroll wheel. The two buttons could be placed on a position other than near the wheel, with the user using the wheel when manual scrolling is desired, and using the buttons when continuous or auto-scrolling is desired. One button could be used for upward auto-scrolling, and the other for downward auto-scrolling. The buttons could alternate between up/down and left/right scrolling by controlling their settings, such as by an short tap of the button, or by using a cursor to set their function. Alternately, separate left/right scrolling buttons could be provided.

Scrolling Buttons

Figure 2:
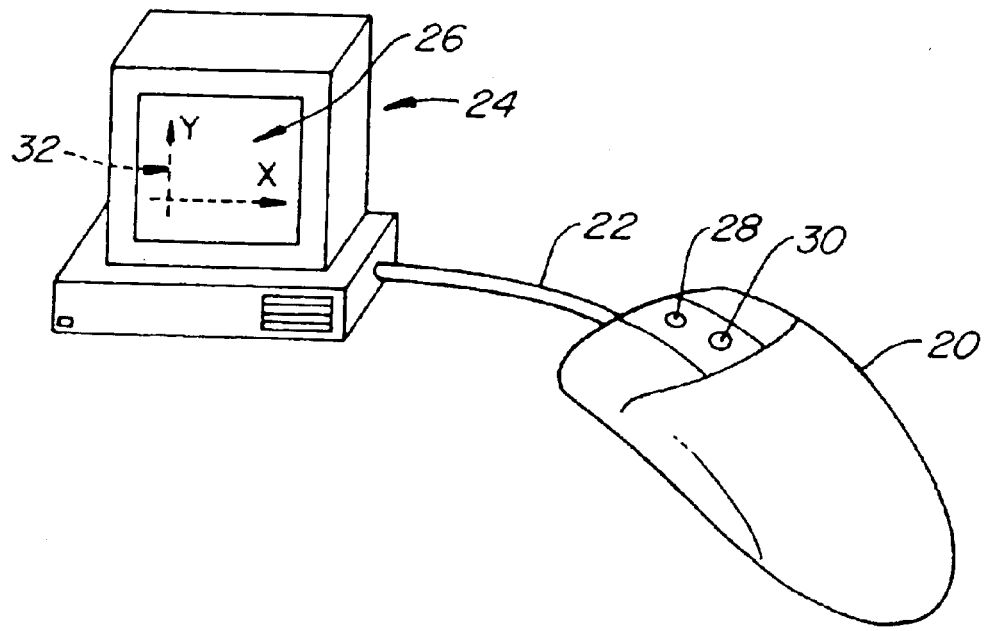
FIG. 2 is a diagram of an embodiment of a mouse with pressure sensitive scrolling buttons connected to a computer system.

FIG. 2 shows an embodiment with a mouse 20 connected via a cable 22 to a computer 24 having a display 26. Instead of a scrolling wheel, this mouse simply has two buttons 28, 30. These buttons can be alternately actuated. Applying a finger to button 28 causes scrolling up, while applying a finger to button 30 causes scrolling down. A short touch by the finger will cause a single "ratchet", or minimum scroll distance, to be applied to display 26. When the button is depressed for a longer period of time than a threshold, continuous scrolling or auto-repeat scrolling is provided, with the speed of the scrolling corresponding to the pressure applied to buttons 28, 30. The higher the pressure, the higher the repetition rate or scrolling speed.

The scrolling can be up or down in the y-direction as illustrated by arrow 32. Alternately, the scrolling can be in x-y direction with a different orientation of the buttons, or additional buttons for this purpose. In addition to scrolling, other movement functions could be controlled by the buttons and wheel of FIGS. 1 and 2. For example, these buttons could control a zoom feature, either zooming in or out depending upon which button is pressed with continuous zooming being activated by the buttons rather than continuous scrolling or auto-repeat. The amount of pressure applied to the buttons can determine the zooming speed. Alternately, the buttons could be used for forward and back functions through multiple pages or plys, such as on an internet browser.

In one embodiment, multiple functions could be performed by the buttons, with the type of function determined by the location of the cursor on the display. For example, locating the cursor in the middle of the display could cause the buttons to control up and down scrolling. Location of the cursor on the top toolbar could cause the buttons to control forward and back movement. Location of the cursor on the bottom toolbar portion of the screen could cause the buttons to control left and right scrolling. In each case, the speed of scrolling, paging, etc., could be controlled by the pressure. In addition, where there is a zoomable feature on the screen, the buttons could be used to control the zooming function.

Figure 3:
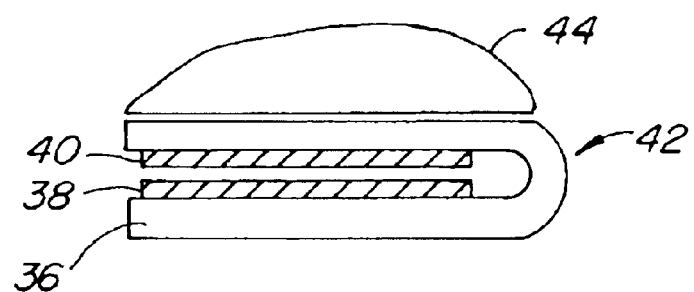
FIG. 3 is a cross-sectional diagram of an embodiment of a pressure sensing resistor used in the present invention.

FIG. 3 illustrates an embodiment of a pressure sensing resistor used for the buttons 14, 16, 28, 30 of FIGS. 1 and 2 in one embodiment. FIG. 3 shows a plastic or thermoplastic film 36 coated with metal to form contacts 38, 40. A small space between the metal contacts on the folded-over film 36 is maintained by the spring force of the bent portion 42 of film 36. By using simply the bent portion of the film, rather than spacers, a small gap and a more sensitive pressure sensing resistor can be provided, which provides for activation at forces less than 50 grams of pressure. Such a low pressure allows less pressure from the user, making the button easier and more comfortable to use, with less strain on the finger to provide the variance in pressure needed. In one embodiment, 36 is formed of a polyester, such as PET (polyethylene terephtalate).

A solid elastomeric dome 44 is placed over pressure sensing resistor. Dome 44 is rigid and does not visibly compress. It allows for the transfer of force from the finger to the pressure sensing resistor. Thus, not only is less force required from the user's finger, less movement of the user's finger is required to generate that force and activate the button. By having a raised, slightly domed shape, dome 44 allows tactile location of the button by the user's finger. The user can simply move the user's finger across the housing until contacting the raised dome to determine the location of the button.

Figure 4:
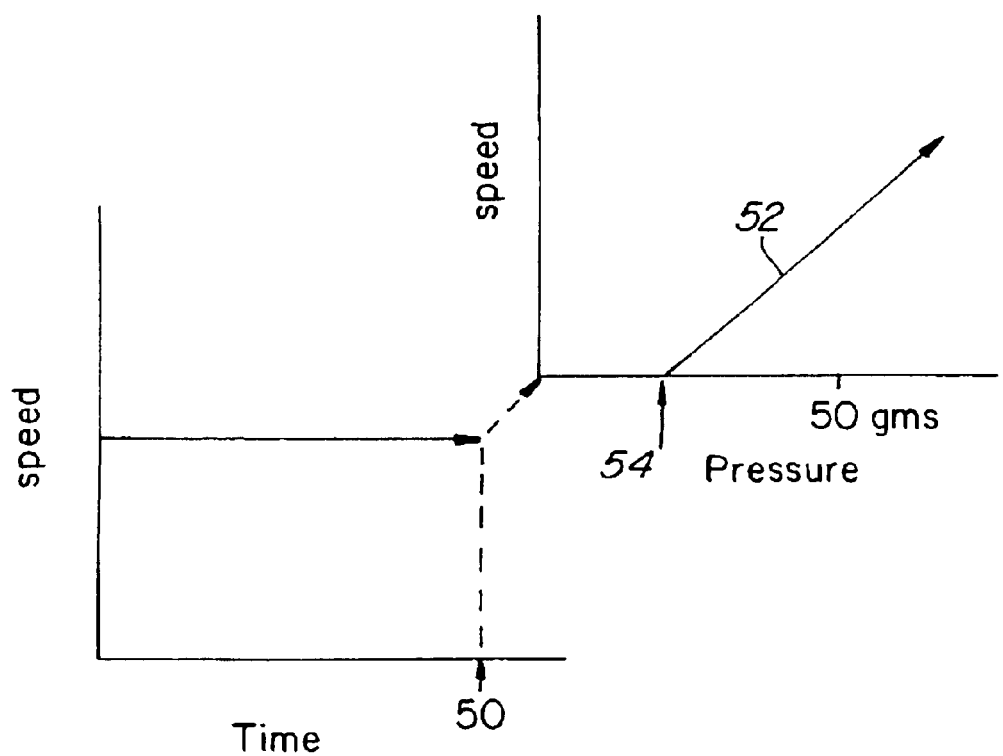
FIG. 4 is a timing and pressure chart illustrating an embodiment of the invention using the dual parameters of time and pressure to control scrolling.

FIG. 4 illustrates one embodiment of the two-parameter control of the scrolling buttons. As illustrated in the first graph, for momentary touches of the button less than a predetermined time 50, a constant speed scroll is used, preferably being a single ratchet or elementary scroll. If the amount of time the finger is in contact with the button exceeds time 50, the button switches into a pressure versus speed mode, where the speed of continuous scrolling as illustrated by arrow 52 varies with the pressure. Note that a minimum pressure 54 is required for activation, and that this is less than 50 grams.

In alternate embodiment, instead of the first parameter being a predetermined time, touches that are less than a predetermined pressure can be used to activate a single ratchet or elementary scroll. Using a pressure threshold, a touch greater than a threshold pressure will then activate the auto-scroll feature. In addition, combinations of the two implementations may be used, such as having the auto-scroll start only if the pressure has been above a given start threshold for a given period of time.

Although a particular pressure sensing resistor has been illustrated in FIG. 3, other pressure-sensitive switches could be used to implement the embodiments shown in FIGS. 1, 2 and 4.

Figure 6:
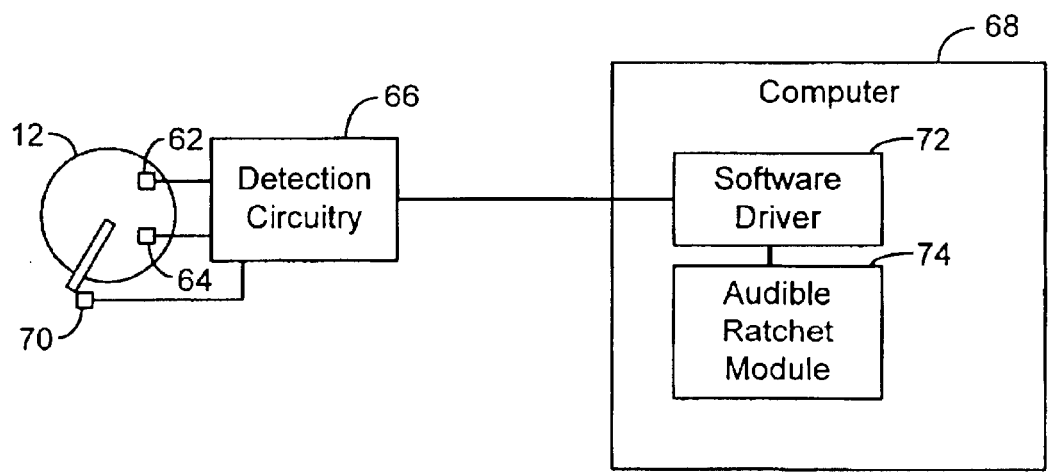
FIG. 6 is a diagram of the electronics of one embodiment of the invention.

FIG. 6 illustrates scrolling wheel 12 with sensors 62, 64 for detecting its rotation, connected to hardware electronic circuitry 66 for detecting movement of the wheel due to user action, and transmitting signals corresponding to the wheel movement to an electronic system, such as computer 68. Circuitry 66 also detects the depression of wheel 12 to activate a switch button 70 mounted below the wheel. Computer 68 is shown as having a software driver 72 for interpreting signals from circuitry 66. When the wheel 12 is replaced by a pressure sensitive element, such as strip 60 of FIG. 5, the software driver provides a single movement on a display of a predetermined amount in response to activation of the strip for less than a predetermined amount of time, and a continuous movement at a speed corresponding to an amount of detected pressure for an activation of said strip for more than the predetermined amount of time. Also shown in FIG. 6 is a module 74 for generating an audible ratchet sound for each predetermined amount of scrolling.

As will be understood by those of skill in the art, the present invention may be embodied in other specific forms without departing from central characteristics thereof. For example, a scrolling wheel or scrolling buttons could be implemented in a mouse, a trackball, a remote control device, a game pad, a joystick, a keyboard, or any other input device. Additionally, in addition to discrete buttons, the pressure sensing resistor could be implemented in an elongated input pad, with one portion of the pad providing up scrolling and the other portion providing down scrolling, or other movement features. Accordingly, the foregoing description is intended to be illustrative, but not limiting, of the scope of the invention which is set forth in the following claims.

What is claimed is:

1. An input device for an electronic system, comprising:

a housing;

electronic circuitry for detecting user inputs and transmitting signals corresponding to said user inputs to said electronic system;

a scrolling element for providing a scrolling input signal;

a switch button mounted proximate to said scrolling element, said switch button upon activation providing a signal to activate continuous scrolling;

wherein said scrolling element comprises a wheel, and said switch button is mounted adjacent and in line with a rotational direction of said wheel; and a second switch button mounted on an opposite side of said wheel from said first mentioned switch button, wherein said first switch button provides a signal for continuous scrolling in a first direction, and said second switch button provides a signal for continuous scrolling in a second direction.

* * * * *